United States Patent
Li et al.

(10) Patent No.: US 10,628,150 B2
(45) Date of Patent: Apr. 21, 2020

(54) SYSTEM AND METHOD FOR UPDATING FIRMWARE IN WIRELESS CHARGER

(71) Applicant: NXP USA, INC., Austin, TX (US)

(72) Inventors: Gang Li, Shanghai (CN); Fei Chen, Shanghai (CN); Ping Zhao, Shanghai (CN)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 16/237,714

(22) Filed: Jan. 1, 2019

(65) Prior Publication Data

US 2019/0354361 A1   Nov. 21, 2019

(30) Foreign Application Priority Data

May 15, 2018  (CN) .......................... 2018 1 0458642

(51) Int. Cl.
  *G06F 8/65* (2018.01)
  *H02J 50/80* (2016.01)
  *H02J 50/12* (2016.01)

(52) U.S. Cl.
  CPC ............... *G06F 8/65* (2013.01); *H02J 50/12* (2016.02); *H02J 50/80* (2016.02)

(58) Field of Classification Search
  None
  See application file for complete search history.

(56) References Cited

U.S. PATENT DOCUMENTS

| | | | |
|---|---|---|---|
| 5,689,825 A | 11/1997 | Averbuch et al. | |
| 7,069,452 B1 | 6/2006 | Hind et al. | |
| 7,890,947 B2 | 2/2011 | Toyoshima | |
| 8,947,042 B2 | 2/2015 | Kirby et al. | |
| 9,077,390 B1 | 7/2015 | Joehren | |
| 9,355,276 B2 | 5/2016 | Laine et al. | |
| 9,627,913 B2 | 4/2017 | Maugars | |
| 9,843,214 B2 | 12/2017 | Peek et al. | |
| 2009/0094593 A1 | 4/2009 | Jiang | |

(Continued)

FOREIGN PATENT DOCUMENTS

EP    2750040    7/2014

OTHER PUBLICATIONS

Neha Jain, Swapnol G. Mali and Suhas Kulkarni, "Infield Firmware Update: Challenges and Solutions", International Conference on Communication and Signal Processing, Apr. 6-8, 2016, pp. 1232-1236, India.

(Continued)

*Primary Examiner* — Philip Wang

(57) ABSTRACT

A method for updating firmware in a wireless charger is implemented when the wireless charger charges a chargeable device. A wireless link is established between the charger and the chargeable device for transferring energy from the charger to the chargeable device. The wireless link also is used to transfer a new version of a firmware program running on the charger, from the chargeable device to the charger. The wireless charger can detect interruption in reception of the new version of the firmware program and identify a breakpoint where the data transfer was interrupted. The wireless charger can resume reception of the firmware program from the breakpoint when the wireless link is re-established. The firmware update can be initiated by an app on the chargeable device.

20 Claims, 7 Drawing Sheets

(56) References Cited

U.S. PATENT DOCUMENTS

| | | | | |
|---|---|---|---|---|
| 2013/0300204 | A1* | 11/2013 | Partovi | H01F 38/14 |
| | | | | 307/104 |
| 2017/0293483 | A1* | 10/2017 | Tian | G06F 9/24 |
| 2019/0044393 | A1* | 2/2019 | Louis | H02J 50/80 |
| 2019/0069244 | A1* | 2/2019 | Jeon | H04W 52/0254 |
| 2019/0095192 | A1* | 3/2019 | Akita | G06F 8/65 |
| 2019/0097447 | A1* | 3/2019 | Partovi | H01F 27/365 |
| 2019/0354361 | A1* | 11/2019 | Li | G06F 8/656 |

OTHER PUBLICATIONS

Poonam Pingale, Kalpana Amrutkar, and Suhas Kulkarni, "Design Aspects for Upgrading Firmware of a Resource Constrained Device in the Field", IEEE International Conference on Recent Trends in Electronics, Information & Communication Technology (RTEICT), May 20-21, 2016, pp. 903-907, India.

* cited by examiner

SYSTEM AND METHOD FOR UPDATING FIRMWARE IN WIRELESS CHARGER

BACKGROUND

The present invention relates generally to wireless chargers, and, more particularly, to method and system for updating firmware in a wireless charger.

Technological advancements have led to emergence and evolution of various portable electronic devices (hereinafter referred to as "portable devices"), such as smartphones, tablets, cameras, laptops, handheld gaming consoles, etc. These portable devices are usually powered by batteries or similar energy storage devices that are rechargeable. It is typical to use adapters with charging cables to charge or recharge such portable devices. More recently, wireless charging systems have become popular as a means for charging these devices, as they eliminate the need of cables and offer a hassle-free charging method.

Generally, a wireless charging system includes a wireless power transmitter as part of a wireless charger and a wireless power receiver integrated in the portable device. The wireless power transmitter includes a transmitter coil and the wireless power receiver includes a receiver coil. The wireless power transmitter transmits a power signal to the wireless power receiver by way of inductive coupling between the transmitter and receiver coils. The wireless power receiver receives the power signal, which charges the battery.

The power transmitter and receiver communicate with each other by modulating the power signal based on various standards, such as the Qi standard developed by the Wireless Power Consortium and the AirFuel Resonant standard developed by the AirFuel Alliance. The interaction between the wireless power transmitter and receiver is dictated by a protocol specified by one of these standards.

The wireless charging systems usually operate based on a firmware file that meets the requirement of the protocol. The firmware file is pre-programmed in memories of the wireless charger and the portable device. This firmware file occasionally needs to be updated to correct bugs or add new features. Portable devices typically have internet connectivity and thus receive firmware updates over the internet. However, the wireless chargers do not have such internet connectivity and hence cannot receive firmware updates over the internet.

A conventional method to update a firmware file of a wireless charger includes dissembling the wireless charger and then reprogramming the memory with the latest firmware file. However, most wireless chargers are difficult for a user to dissemble and hence professional assistance is required for dissembling and reprogramming. Therefore, manufacturers of wireless chargers may have to recall the wireless chargers for reprogramming, which is costly and inconvenient, especially when there are many devices to be reprogrammed.

The aforementioned problem is solvable by including an additional communication port, such as universal asynchronous receiver-transmitter (UART), within the wireless charger so that it can receive the latest firmware files. However, the inclusion of a communication port increases the cost and size of wireless charger.

In therefore would be advantageous to have a method and a system for updating the firmware of a wireless charger in a cost efficient and timely manner, yet does not require either disassembly or a costly communication port.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
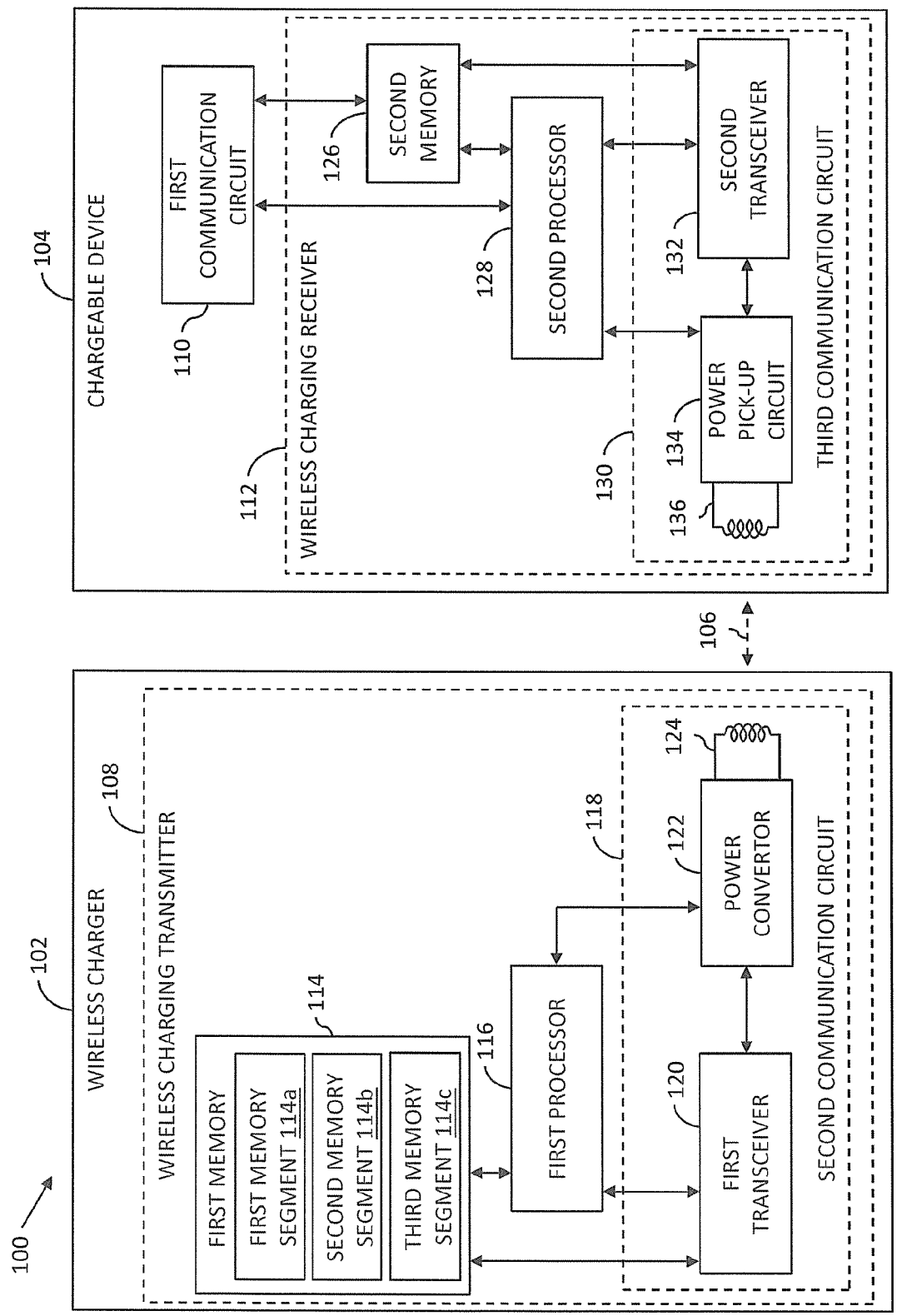
FIG. 1 is a schematic block diagram of a wireless charging system in accordance with an embodiment of the present invention.
Figure 2A:
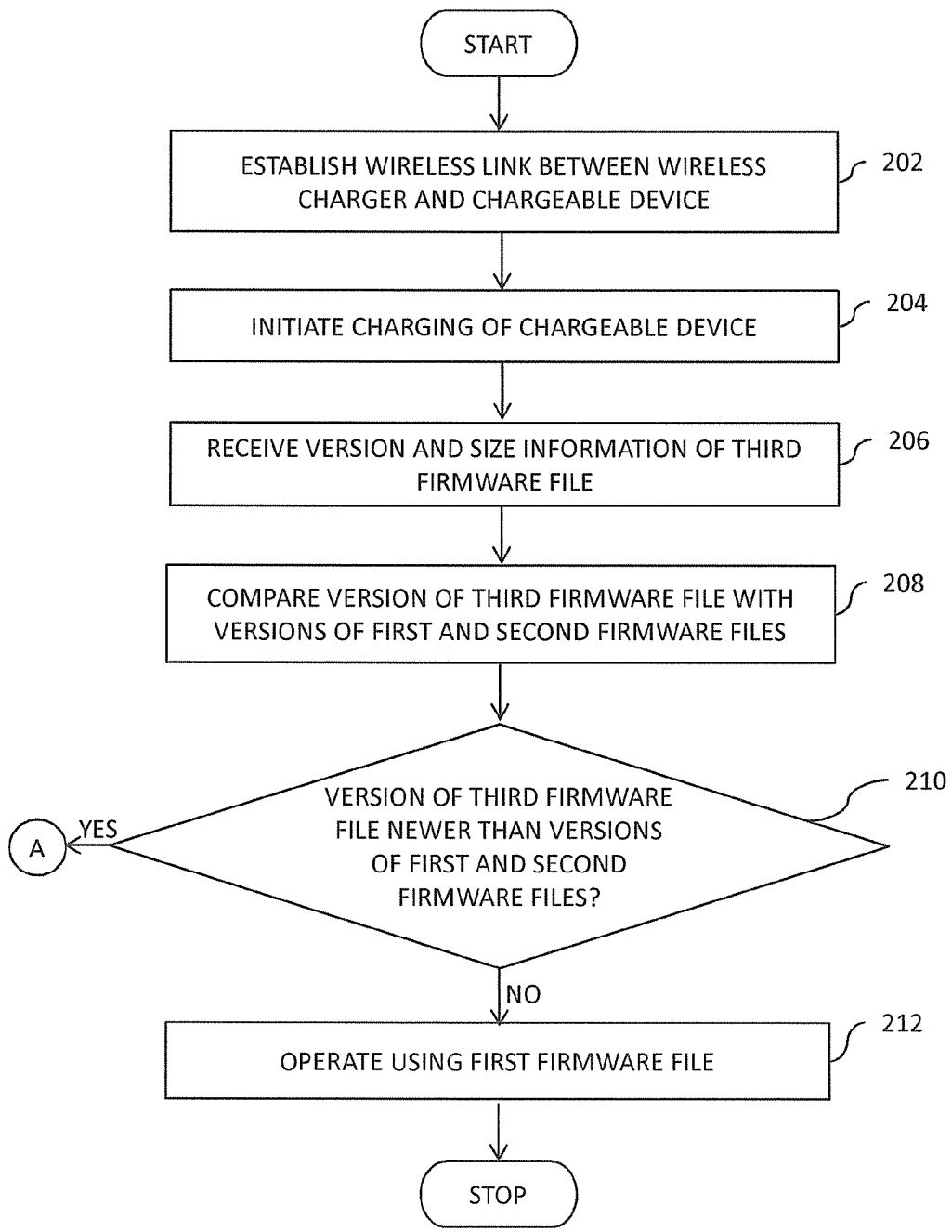
FIGS. 2A, 2B, 2C and 2D are a flow chart illustrating a method for firmware update in a wireless charger in accordance with an embodiment of the present invention.
Figure 2B:
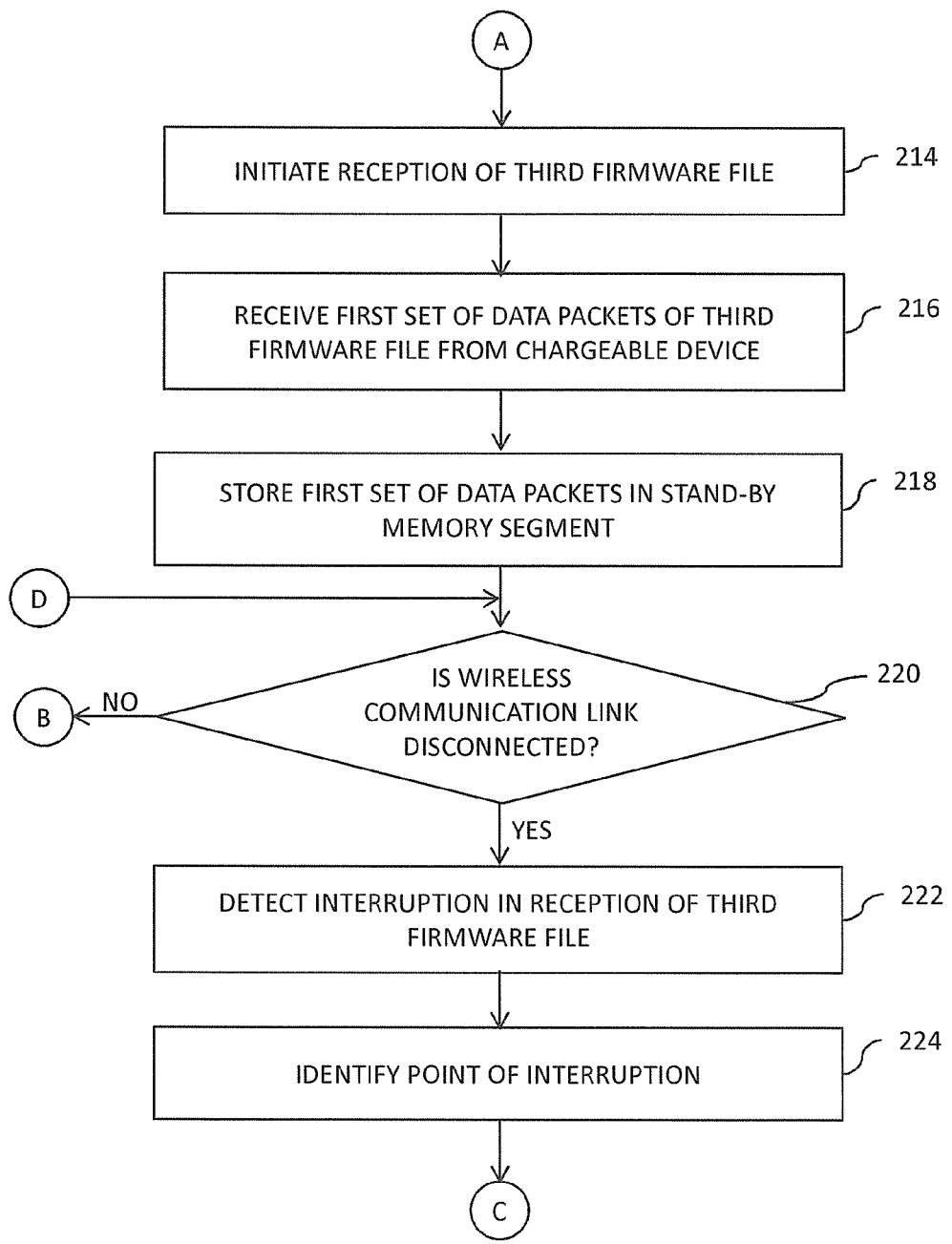
Figure 2C:
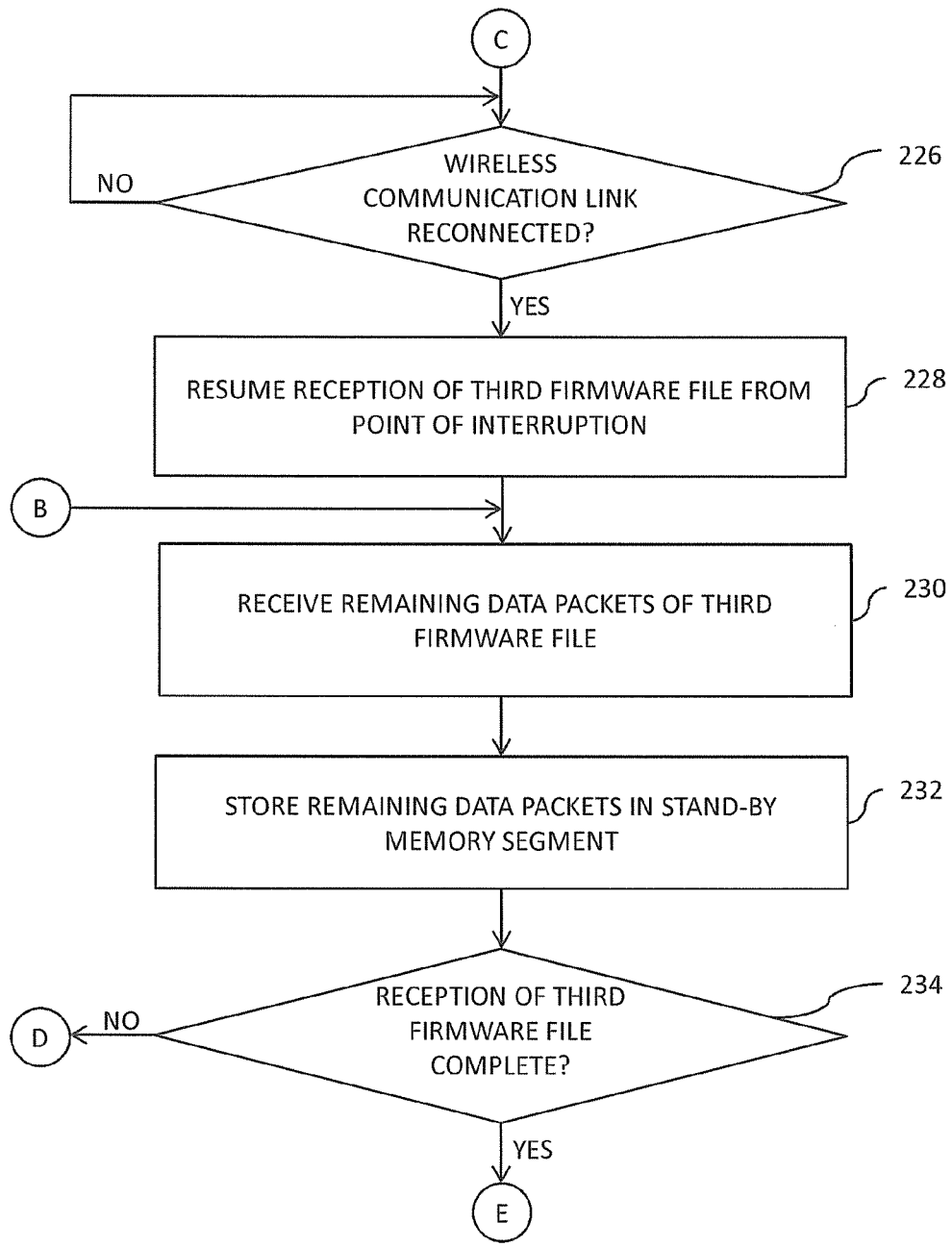
Figure 2D:
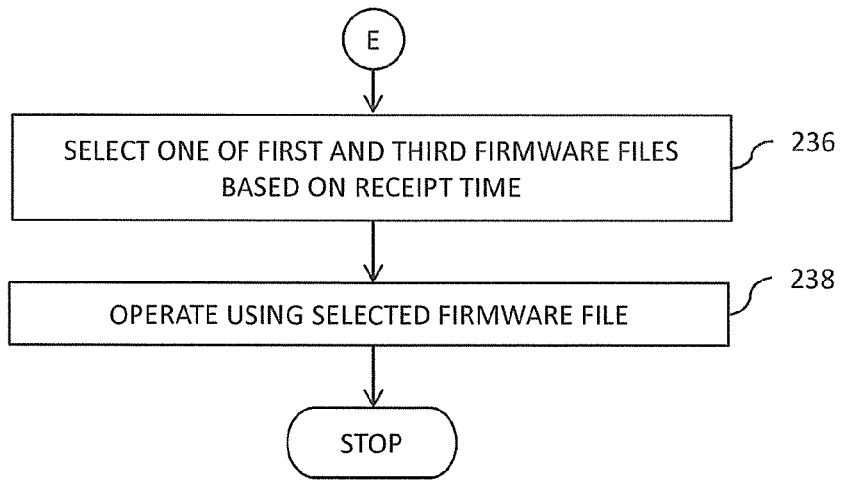

The detailed description of the appended drawings is intended as a description of the currently preferred embodiments of the present invention and is not intended to represent the only form in which the present invention may be practiced. It is to be understood that the same or equivalent functions may be accomplished by different embodiments that are intended to be encompassed within the spirit and scope of the present invention.

In one embodiment of the present invention, a wireless charger wire for charging a chargeable device over a wireless link is provided. The wireless charger includes a communication circuit, a memory, and a processor. The communication circuit includes a first transceiver, a power converter, and a first coil. The first coil creates an electromagnetic field to transfer energy over the wireless link to a second coil in the chargeable device, wherein the energy is used by the chargeable device to re-charge its battery. The memory is coupled to the communication circuit, and includes a first segment for storing a boot program, a second segment for storing a first version of a firmware program, and a third segment for storing a second version of the firmware program. The processor is coupled to the communication circuit and the memory, and operates based on a selected one of the first and second versions of the firmware program. The communication circuit is configured to receive the second version of the firmware program from the chargeable device, by way of the wireless link, and store the second version of the firmware program in the third segment of the memory. The processor selects between the first and second versions of the firmware program based on which of the second and third memory segments was most recently updated.

In another embodiment, the present invention provides for updating a firmware program in a wireless charger, where the wireless charger transfers energy over a wireless link to a chargeable device to charge a battery of the chargeable device, and where a first version of the firmware program is stored in a first memory segment of a memory of the wireless charger. The method comprises receiving, by a communication circuit of the wireless charger, from the chargeable device, a second version of the firmware program over the wireless link, and storing, by the communication circuit, the second version of the firmware program in a second memory segment of the memory. The method also comprises selecting, by a processor of the wireless charger, between the first and second versions of the firmware program based on which of the first and second memory segments was most recently updated.

Various embodiments of the present invention provide method and system for updating firmware in a wireless charger. The wireless charger operates based on a first firmware file stored in a first or current memory segment of a memory of the wireless charger. The wireless charger establishes a wireless communication link with a chargeable device for charging the chargeable device. When the chargeable device has a firmware update for the wireless charger or a user of the chargeable device wishes to update the firmware of the wireless charger, the wireless charger receives a second firmware file from the chargeable device over the wireless communication link established between the charger and the charging device. The wireless charger stores the second firmware file in a second or stand-by memory segment of the memory. If the wireless communication link is disconnected before the complete reception of the second firmware file, the wireless charger detects interruption in reception of the second firmware file, and identifies the point of interruption, based on a size of the second firmware file and a size of a first set of data-packets of the second firmware file that were received before the wireless link was disconnected. When the wireless communication link is reestablished, the wireless charger resumes reception of the second firmware file from the point of interruption, and receives the remaining sets of data-packets of the second firmware file. When reception of the second firmware file is complete, the wireless charger begins to operate using the second firmware file, and the second memory segment begins to serve as the current memory segment.

The method and system eliminate the need to dissemble the wireless charger to update its firmware. Since the wireless communication link is used to receive a new firmware file, an additional communication port is not required to be included in the wireless charger. Hence, the method and system offer a cost efficient and timely means to update the firmware file of the wireless charger. Further, if reception of the new firmware file is interrupted due to the wireless communication link being disconnected, the firmware update can be resumed when the wireless communication link is reestablished. Thus, the current firmware file of the wireless charger can be upgraded without any inconvenience.

Referring now to FIG. 1, a schematic block diagram of a wireless charging system 100, in accordance with an embodiment of the present invention, is shown. The wireless charging system 100 includes a wireless charger 102 that communicates with a chargeable device 104 by way of a wireless communication link 106. The wireless charger 102 and the chargeable device 104 communicate with each other based on a wireless charging protocol. Examples of the wireless charging protocol include the Qi, AirFuel Inductive, and AirFuel Resonant protocols.

The wireless charger 102 is an electronic device used for charging the chargeable device 104, wirelessly. Examples of the wireless charger 102 include a wireless charging mat, a wireless charging station, a wireless charging stand, a wireless charging table, and the like. The wireless charger 102 is connected to a power source (not shown), such as an alternating current/direct current (AC/DC) adapter, for receiving an input power signal. In one example, the input power signal is in the form of a DC voltage signal. The wireless charger 102 generates an output power signal (not shown) based on the input power signal, and transmits the output power signal to the chargeable device 104, by way of the wireless link 106, for charging the chargeable device 104. It will be apparent to a person having ordinary skill in the art that charging of the chargeable device 104 refers to the charging of a battery (not shown) of the chargeable device 104. The wireless charger 102 transmits the output power signal for charging the chargeable device 104 in accordance with the wireless charging protocol.

The wireless charger 102 is programmed to operate based on firmware stored in a first or current firmware file. The wireless charger 102 communicates with the chargeable device 104 via the wireless link 106 for updating the current firmware file. The wireless charger 102 includes a wireless charging transmitter 108 for charging the chargeable device 104 and updating the current firmware file.

The chargeable device 104 is a portable electronic device including a rechargeable battery (not shown). The battery is charged wirelessly by way of the wireless charger 102. Examples of the chargeable device 104 include smartphones, tablets, cameras, laptops, handheld gaming consoles, wearable devices, etc. The chargeable device 104 is equipped with a first communication circuit 110 that provides internet connectivity to the chargeable device 104. Examples of the first communication circuit 110 include a Bluetooth transceiver, a Zigbee transceiver, a near-field communication (NFC) transceiver, a Wi-Fi transceiver, and the like. The first communication circuit 110 is known by those of skill in the art. For example, if the chargeable device 104 is a smartphone, then the first communication circuit 110 comprises the circuitry within the smartphone that allows the smartphone to access a network (e.g., the internet) using either a cellular or WiFi connection. When a firmware update is available for the wireless charger 102, the chargeable device 104 connects to the internet by way of the first communication circuit 110, and receives a new firmware file associated with the available firmware update. Thus, the chargeable device 104 acts as an intermediary for passing the firmware update to the wireless charger 102.

The chargeable device 104 further includes a wireless charging receiver 112. The wireless charging receiver 112 receives the output power signal from the wireless charger 102 over the wireless link 106 for charging the battery. The wireless charging receiver 112 transmits a data signal, which includes the new firmware file, to the wireless charger 102 over the wireless link 106.

The wireless link 106 is a bi-directional communication link established between the wireless charger 102 and the chargeable device 104 based on one of the aforementioned protocols. In one embodiment, the wireless link 106 is established when the chargeable device 104 is placed within a predefined distance from the wireless charger 102. The predefined distance defines a range of a wireless power field, such as an electromagnetic field, generated by way of the output power signal. In another embodiment, the wireless link 106 is established when the chargeable device 104 is in contact with the wireless charger 102. The wireless link 106 is a NFC signal, such as a Bluetooth or Zigbee signal. That is, the coupling of the antennas (134 and 136, described later) allows for a low rate (0.1-1K bps) bidirectional communication channel between the transmitter and receiver during wireless charging. As discussed more below, the charger 102 runs with the firmware stored in a flash segment of a memory.

The wireless charging transmitter 108 enables transmission of the output power signal to the chargeable device 104 for charging the chargeable device 104. The wireless charging transmitter 108 further enables the wireless charger 102 to perform firmware update operations when the chargeable device 104 determines that the firmware update is available. In one embodiment, the wireless charging transmitter 108 is implemented on an integrated circuit.

The wireless charging transmitter 108 includes a first memory 114, a first processor 116, and a second communication circuit 118. The first memory 114 is a non-volatile memory used to store the current firmware file for the operation of the wireless charger 102. Examples of the first memory 114 includes a flash memory, a ferromagnetic random-access memory (FRAM), or the like. In one embodiment, the first memory 114 stores an old firmware file associated with a previous firmware update. The first memory 114 is connected to the first processor 116 and the second communication circuit 118. In the presently preferred embodiment, the first memory 114 is partitioned into multiple memory segments, such as first through third memory segments 114a-114c.

The first memory segment 114a is used to store boot loader data, the second memory segment 114b is used to store the first firmware file, and the third memory segment 114c is used to store a second firmware file (i.e., the old firmware file) associated with the previous firmware update. In another embodiment, the third memory segment 114c may have free memory space for storing the new firmware file.

The first processor 116 includes suitable logic, circuitry, and/or interfaces for operating based on the wireless charging protocol. The first processor 116 is configured to execute various wireless charging operations, as are known in the art, as well as perform firmware update operations. The first processor 116 is connected to the first memory 114 and the second communication circuit 118. In the presently preferred embodiment, the first processor 116 comprises a low cost microcontroller, such as those available from NXP Semiconductors B.V. of the Netherlands, other processors could be used, such as a system on chip (SoC), an application-specific integrated circuit (ASIC) processor, a reduced instruction set computing (RISC) processor, a complex instruction set computing (CISC) processor, or a field-programmable gate array (FPGA) processor.

When the wireless charger 102 is powered on, the first processor 116 loads and runs the boot loader from the first memory segment 114a. The boot loader enables the first processor 116 to identify and select one of the second and third memory segments 114b and 114c as a current memory segment. Thus, at a given time-instance one of the second and third memory segments 114b and 114c is selected by the first processor 116 to function as the current memory segment and the other as a stand-by memory segment.

In one embodiment, the first processor 116 selects one of the second and third memory segments 114b and 114c as the current memory segment, based on a version of a firmware file stored in each of the second and third memory segments 114b and 114c. For example, the second firmware file stored in the third memory segment 114c is an older version than the first firmware file stored in the second memory segment 114b. Hence, the first processor 116 selects the second memory segment 114b as the current memory segment. The third memory segment 114c having the second firmware file (i.e., the old firmware file) stored therein, thus serves as the stand-by memory segment.

In another embodiment, the firmware versions stored in the second and third memory segments 114b and 114c include a receipt time stamp, and this time stamp is used to determine which firmware version is the newest and should be executed. For example, the first firmware file stored in the second memory segment 114b has a later receipt time than the second firmware file stored in the third memory segment 114c, so the first processor 116 selects the second memory segment 114b as the current memory segment and the third memory segment 114c then serves as the stand-by memory segment. Based on the selection of the current memory segment, the first processor 116 loads and runs the firmware file (i.e., the current firmware file) stored in the current memory segment for performing the wireless charging operations.

When the chargeable device 104 is in contact with or is within the predefined distance from the wireless charger 102, the first processor 116 initiates the charging of the chargeable device 104 by way of the second communication circuit 118 and the wireless link 106. During the charging of the chargeable device 104, the first processor 116 also may perform firmware update operations by way of the second communication circuit 118 and the wireless link 106.

While performing the firmware update operations, the first processor 116 receives a third firmware file (i.e., the new firmware file) from the chargeable device 104 by way of the wireless link 106 and the second communication circuit 118. In one scenario, if the wireless link 106 is interrupted or disconnected before receipt of the third firmware file has completed, then the first processor 116 detects the interruption in reception of the third firmware file and identifies the point in the file transmission where the interruption occurred. The first processor 116 then resumes reception of the third firmware file from the point of interruption when the wireless link 106 is reestablished. The first processor 116 stores the third firmware file in the memory segment that is identified as the stand-by memory segment. For example, if the third memory segment 114c is identified as the stand-by memory segment, then the first processor 116 stores the third firmware file in the third memory segment 114c. The third firmware file then replaces the second firmware file previously stored in the third memory segment 114c. Upon completion of the firmware update, the first processor 116 selects one of the second and third memory segments 114b and 114c as the current memory segment and operates using the firmware stored in the indicated current memory segment.

The second communication circuit 118 is connected to the first memory 114 and the first processor 116. The second communication circuit 118 establishes the wireless link 106 with the chargeable device 104. The second communication circuit 118 transmits the output power signal to the chargeable device 104 and receives the third firmware file (i.e., the new firmware file) from the chargeable device 104, by way of the wireless link 106. The second communication circuit 118 includes a first transceiver 120, a power converter 122, and a transmitter coil 124.

The first transceiver 120 is connected to the first processor 116 and the first memory 114. In one example, the first transceiver 120 is a modulator/demodulator circuit. In one embodiment, the first transceiver 120 is connected to the first memory 114 by way of a buffer memory (not shown). The first transceiver 120 receives the input power signal and provides it to the power converter 122. In one embodiment, the first transceiver 120 also receives the third firmware file transmitted over the link 106 by the chargeable device 104.

The power converter 122 is connected to the first transceiver 120 for receiving the input power signal. The power converter 122 also is connected to the first processor 116 for receiving a transmitter control signal. In one embodiment, the transmitter control signal is a pulse-width modulated (PWM) signal. The power converter 122 converts the input power signal to a first AC voltage signal based on the transmitter control signal. An operating frequency of the first AC voltage signal is equal to the operating frequency of the transmitter control signal. The power converter 122 then provides the first AC voltage signal to the transmitter coil 124. An amount of power transmitted to the chargeable device 104 via the first AC voltage signal is controlled based on the operating frequency of the transmitter control signal and an amplitude of the input power signal. For example, the operating frequency of the transmitter control signal may be reduced or the amplitude of the input power signal may be increased to increase the power transmitted to the chargeable device 104.

The transmitter coil 124 is an induction coil that is connected to the power converter 122 for receiving the first AC voltage signal. The transmitter coil 124 may include a single coil or an array of coils. The transmitter coil 124 radiates the first AC voltage signal as the output power signal.

The wireless charging receiver 112 is connected to the first communication circuit 110 and the battery. The wireless charging receiver 112 communicates with the wireless charging transmitter 108 by way of the wireless link 106. The wireless charging receiver 112 receives the output power signal radiated by the transmitter coil 124 over the wireless communication link 106 and charges the battery, as is known by those of skill in the art.

The wireless charging receiver 112 transmits the data signal to the wireless charging transmitter 108 over the wireless link 106. The data signal includes information pertaining to the new firmware file, which includes size and version information of the new firmware file and data packets of the new firmware file. In one embodiment, the data signal also indicates an amount of power drawn by the battery of the chargeable device 104 during charging. The wireless charging receiver 112 includes a second memory 126, a second processor 128, and a third communication circuit 130.

The second memory 126 is a non-volatile memory that is connected to the first communication circuit 110, the second processor 128, and the third communication circuit 130. The second memory 126 may comprise a flash memory, an FRAM, and the like. The second memory 126 receives and stores the firmware update file from the first communication circuit 110. The second memory 126 may also store software, such as an operating system, that is compatible with the wireless charging protocol for the operations of the chargeable device 104.

The second processor 128 is connected to the first communication circuit 110, the second memory 126, and the third communication circuit 130. The second processor 128 runs the operating system of the chargeable device 104. The second processor 128 may comprise commercially available processors or microcontrollers or a known chip-set, such as the Snapdragon 845 available from Qualcomm, Inc. of San Diego, Calif. The second processor 128 receives the new firmware file associated with the firmware update of the wireless charger 102 by way of the first communication circuit 110 and stores it in the second memory 126. The second processor 128 then performs the firmware update operations to update the current firmware file of the wireless charger 102. The second processor 128 generates a data signal for transmitting the new firmware file to the wireless charger 102.

The third communication circuit 130 is connected to the second memory 126 and the second processor 128. The third communication circuit 130 includes a second transceiver 132, a power pick-up circuit 134, and a receiver coil 136.

The receiver coil 136 is an induction coil, and may comprise either a single coil or an array of coils. When the chargeable device 104 is brought within the predefined distance of the wireless charger 102 or placed in contact with the wireless charger 102, the wireless link 106 is established between the transmitter and receiver coils 124 and 136 by inductive coupling therebetween, as is known by those of skill in the art. The receiver coil 136 receives the output power signal from the transmitter coil 124 by way of the wireless link 106. Based on the output power signal, a second AC voltage signal is induced across the receiver coil 136.

The power pick-up circuit 134 is connected to the second processor 128, and to the receiver coil 136 for capturing the second AC voltage signal induced across the receiver coil 136. The power pick-up circuit 134 also is connected to the second transceiver 132 and provides the second AC voltage signal to the second transceiver 132.

The second transceiver 132 is connected to the second memory 126, the second processor 128, and the power pick-up circuit 134. The second transceiver 132 also is connected to the battery of the chargeable device 104. The second transceiver 132 receives the second AC voltage signal and provides it to the battery to charge the battery. The second transceiver 132 also receives the data signal from the second processor 128, and provides the data signal to the power pick-up circuit 134, which in turn provides it to the receiver coil 136. The receiver coil 136 transmits the data signal to the wireless charger 102 over the wireless link 106.

In operation, when the wireless charger 102 is powered on, the first processor 116 loads and runs the boot loader from the first memory segment 114a. The boot loader enables the first processor 116 to identify and select one of the second and third memory segments 114b and 114c as the current memory segment. In the presently preferred embodiment, such selection is done based on the time when the firmware was stored in the memory segment. The first processor 116 identifies that the first firmware file stored in the second memory segment 114b (for example) has the most recent time stamp, as compared to the second firmware file stored in the third memory segment 114c, so the first processor 116 selects the second memory segment 114b as the current memory segment. The third memory segment 114c in this scenario then serves as the stand-by memory segment. The first processor 116 loads and runs the first firmware file (i.e., the current firmware file) from the second memory segment 114b (i.e., the current memory segment) for performing wireless charging operations. The first processor 116 further generates a transmitter control signal.

Based on the transmitter control signal, the power converter 122 generates the first AC voltage signal, and provides the first AC voltage signal to the transmitter coil 124. The transmitter coil 124 radiates the first AC voltage signal as the output power signal.

When the chargeable device 104 is placed within the predefined distance or in contact with the wireless charger 102, the wireless link 106 is established between the transmitter and receiver coils 124 and 136. In one embodiment, when the chargeable device 104 is not compatible with the wireless charging protocol of the wireless charger 102, the wireless link 106 is not established.

The receiver coil 136 receives the output power signal from the transmitter coil 124. The output power signal causes the second AC voltage signal to be induced across the receiver coil 136, which is captured by the power pick-up circuit 134. The second transceiver 132 receives the second AC voltage signal, captured by the power pick-up circuit 134, and provides it to the battery for charging. Based on the amount of power drawn by the battery from the second AC voltage signal, the second processor 128 generates the data signal. The second transceiver 132 receives the data signal and provides the data signal to the receiver coil 136 by way of the power pick-up circuit 134. The receiver coil 136 transmits the data signal to the transmitter coil 124, which provides it to the first processor 116. The first processor 116 generates the transmitter control signal again based on the data signal. The charging of the chargeable device 104 continues until the battery is charged completely or the wireless link 106 is disconnected.

During the charging of the chargeable device 104, the first processor 116 generates a firmware update request to inquire about any available firmware update. The firmware update request includes version information of the current firmware of the wireless charger 102. The first processor 116 provides the firmware update request to the second communication circuit 118 for transmission to the chargeable device 104. That is, the second communication circuit 118 transmits the firmware update request from the first processor 116 over the wireless link 106 as a part of the output power signal. It will be understood by those of skill in the art that data signals may be combined with the power signal and transmitted over the wireless link 106. For example, in the Qi protocol, the receiver 112 communicates with the transmitter 108 using backscatter modulation, in which the receiver 112 modulates the amount of power that it draws from the power signal. The transmitter 108 communicates with the receiver 112 using Frequency Shift Keying (FSK), in which the transmitter 108 modulates the operating frequency of the power signal. Bidirectional communication baud rate is slow, e.g., maximum 2 Kbps, considering the blank timing and protocol overhead, the effective data rate could be down to 30~50 bps.

The third communication circuit 130 receives the output power signal and provides it to the second processor 128. The second processor 128 isolates the firmware update request from the output power signal. Based on the firmware update request, the second processor 128 determines if any firmware update is available for the wireless charger 102 using the internet to establish a connection with the manufacturer of the wireless charger 102. The firmware update will be referred to as the third firmware file. The second processor 128 then downloads the third firmware file and stores it in the second memory 126. The second processor 128 then generates a firmware availability notification in response to the firmware update request of the first processor 116. The firmware availability notification indicates that the firmware update is available with the chargeable device 104. In the presently preferred embodiment, the firmware availability notification includes version and size information of the third firmware file. The version and size information indicate a version and a size of the third firmware file, respectively. In another embodiment, the firmware availability notification may indicate that no new firmware update is available.

The second processor 128 provides the firmware availability notification to the third communication circuit 130, which transmits it to the wireless charger 102 as a part of the data signal over the wireless communication link 106. The second communication circuit 118 receives the firmware availability notification and provides it to the first processor 116.

When the firmware availability notification indicates that the firmware update is available with the chargeable device 104, the first processor 116 compares a version of the first firmware file (i.e., the current firmware file) with the version of the third firmware file to determine which is newer. In another embodiment, the first processor 116 compares a time-stamp on the first and third firmware files to determine which is the latest. When the first processor 116 determines that the version of the first firmware file is older than the version of the third firmware file, the first processor 116 initiates a firmware update. In another embodiment, the first processor 116 may compare the version of the third firmware file with the versions of both the first and second firmware files.

The first processor 116 generates a first request to instruct the chargeable device 104 to initiate transmission of the third firmware file. The first request indicates that the wireless charger 102 is ready to receive the third firmware file. The first processor 116 provides the first request to the second communication circuit 118, which in turn transmits the first request to the third communication circuit 130 over the wireless link 106. The third communication circuit 130 provides the first request to the second processor 128.

In one embodiment, the charger 102 is programmed to mate with a pre-identified chargeable device 104, that is, a trusted device, for data communications and firmware updating. The chargeable device may be identified as a trusted device by, for example, receiving and checking an RFID of the chargeable device.

In response to the first request, the second processor 128 generates a first acknowledgement and communicates the first acknowledgement to the first processor 116 by way of the wireless communication link 106. Further, the second processor 128 initiates transmission of the third firmware file to the wireless charger 102. For transmitting the third firmware file, the second processor 128 retrieves the third firmware file from the second memory 126 and provides it to the third communication circuit 130. The third communication circuit 130 transmits the third firmware file in sequential data packets to the second communication circuit 118 over the wireless link 106, while the chargeable device 104 is being charged. The third firmware file is transmitted as a part of the data signal.

The second communication circuit 118 receives the data signal and provides it to the first processor 116. The first processor 116 identifies and retrieves the data packets associated with the third firmware file from the data signal. The first processor 116 then stores the data packets in the third memory segment 114c (i.e., the stand-by memory segment) to replace the second firmware file. In one embodiment, the first processor 116 indirectly stores the data packets of the third firmware file in the third memory segment 114c. In such a scenario, the data packets received by the second communication circuit 118 are first stored in a buffer and then transferred to the third memory segment 114c when the buffer is full. For example, if the size of the third firmware file is 62 Kilobytes (KB), the size of the buffer is 128 bytes, and the second communication circuit 118 receives 8 bytes of the third firmware file per second, then in this scenario, the first processor 116 first stores the data packets of the third firmware file in the buffer, and when the buffer is full, the first processor 116 transfers the 128 bytes of the third firmware file from the buffer to the third memory segment 114c. After the transfer, the buffer is available for receiving subsequent data packets of the third firmware file. This process is repeated until reception of the third firmware file is complete. Note, it will be understood by those of skill in the art that rather than the processor 116 performing the data transfer, a memory controller associated with the processor could perform the data transfer.

It is foreseeable that the wireless link 106 may be disconnected before reception of the third firmware file is complete, such as if the charger 102 is powered off, the chargeable device is powered off, or the chargeable device 104 is removed from the charger 102 or moved out of range of the charger 102. Therefore, in accordance with an embodiment of the present invention, the first processor 116 detects interruption in reception of the third firmware file when the wireless link 106 is broken (disconnected). The wireless charger 102 may have received a first set of data packets of the third firmware file before the disconnection of the wireless link 106.

In such a scenario, the first processor 116 identifies the point of interruption (e.g., sets a breakpoint) where reception of the third firmware file is interrupted. The breakpoint can be identified based on a size of the first set of data packets and the size of the third firmware file. For example, if the first set of data packets has a size of 30 KB and the size of the third firmware file is 62 KB, then the first processor 116 can determine that 30 KB of the third firmware file has been received and 32 KB is pending. Hence, the first processor 116 identifies the point of interruption to be at 30 KB.

The first processor 116 monitors the data signal to detect when the wireless link 106 is reestablished. When the second communication circuit 118 receives the data signal from the chargeable device 104, the first processor 116 detects that the wireless link 106 has been reconnected. In one embodiment, the wireless charger 102 (i.e., the first processor 116), can determine if the reestablished connection is with a new device or the same device. If the connection is reestablished with the same device 104, then the first processor 116 resumes reception of the third firmware file from the breakpoint. To resume reception of the third firmware file, the first processor 116 generates a resume request that indicates the breakpoint, and provides the resume request to the second communication circuit 118 for transmitting to the third communication circuit 130.

In one embodiment, the wireless charger 102 waits until the same rechargeable device is reconnected thereto, and then resumes downloading the firmware update. In another embodiment, when another or different chargeable device is connected to the wireless charger 102, then the wireless charger 102 can issue a request to the different connected device to download the firmware from the breakpoint. Alternatively, the wireless charger 102 could ignore the previous, uncompleted download, and re-start the firmware update from the beginning, as long as the newly connected device supports the same firmware update protocol.

The third communication circuit 130 receives the resume request and provides it to the second processor 128. Based on the resume request, the second processor 128 resumes transmission of the third firmware file from the point of interruption or breakpoint. For example, if the breakpoint is 30 KB, the second processor 128 resumes transmission of the third firmware file after 30 KB, and transmits the remaining data packets of the third firmware file to the first processor 116 over the wireless link 106.

It will be apparent to a person having ordinary skill in the art that the wireless communication link 106 may disconnected multiple times during reception of the third firmware file. Thus, the first processor 116 identifies the point of interruption each time the wireless communication link 106 is broken.

Once reception of the third firmware file is complete, the first processor 116 selects the third memory segment 114c as the current memory segment, which may be determined because the third firmware file has the latest receipt time compared to the first firmware file stored in the second memory segment 114b. The second memory segment 114b then serves as the stand-by memory segment and will be used for receiving a subsequent firmware update.

In one embodiment, the chargeable device 104 has a firmware update application (APP) stored in the second memory 126, which may be executed by a user by opening the app and selecting a firmware update, such as by using a graphical user interface (GUI) on a display (not shown) of the chargeable device 104. Based on the selection by the user, the chargeable device 104 transmits the selected firmware file to the wireless charger 102 and the wireless charger 102 performs the firmware update operations as explained above. In one embodiment, the firmware file selected by the user may have a version that is older than the version of the current firmware file of the wireless charger 102. In other words, the firmware update application allows the user to downgrade the firmware of the wireless charger 102. In another embodiment, the firmware file selected by the user may have a version that is newer than the version of the current firmware file of the wireless charger 102. In other words, the firmware update app allows the user to select either a newer or an older firmware version to download to the wireless charger 102.

The wireless charging transmitter 108 updates the firmware of the wireless charger 102 efficiently. The wireless charging transmitter 108 uses the wireless link 106 established during the charging of the chargeable device 104 to update the firmware. The chargeable device 104 uses the data signal to transmit the new firmware file to the wireless charger 102 during the charging of the wireless charger 102. Therefore, the need to disassemble the wireless charger 102 for reprogramming is eliminated.

The existing wireless communication link 106 is used for communication between the wireless charger 102 and the chargeable device 104. In other words, the existing wireless link 106 is used to transmit the new firmware file from the chargeable device 104 to the wireless charger 102. Thus, an additional communication port is not required in the wireless charger 102 for receiving firmware updates. This way, an increment in the cost as well as the size of the wireless charger 102 is avoided. Further, the first processor 116 automatically updates the firmware of the wireless charger 102 during the charging of the chargeable device 104. Therefore, the user of the chargeable device 104 does not need to connect the chargeable device 104 to the wireless charger 102 specifically for the purpose of updating the firmware.

If the wireless communication link 106 is interrupted during reception of the firmware file, the first processor 116 is able to resume reception of the new firmware file from the point of interruption. Therefore, the user of the chargeable device 104 is free to take the chargeable device 104 away from the wireless charger 102 during the firmware update without affecting the first set of data packets that have already been received by the wireless charger 102. Additionally, the firmware update app installed on the chargeable device 104 allows the user to select the new firmware file to be transmitted to the wireless charger 102. Hence, the user can upgrade or downgrade the firmware of the wireless charger 102.

The operation of the wireless charger 102 and the chargeable device 104 will now be explained with reference to FIGS. 2A-2D and 3A-3C.

Referring now to FIGS. 2A-2D, a flow chart illustrating a method for updating firmware in a wireless charger (such as the wireless charger 102 of FIG. 1), in accordance with an embodiment of the present invention, is shown. The wireless charger 102 is powered on and boots using the boot program stored in the first memory segment 114a and then selects either the second or third memory segments, whichever has the latest firmware version, for execution. In the examples discussed below, the first firmware file (i.e., the current firmware file) is stored in the second memory segment 114b (i.e., the current memory segment), and the third memory segment 114c serves as the stand-by memory segment having the second firmware file stored therein.

At step 202, the wireless charger 102 establishes the wireless communication link 106 between the wireless charger 102 and the chargeable device 104, when the chargeable device 104 is brought in contact or within the predefined distance from the wireless charger 102.

At step 204, the wireless charger 102 initiates the charging of the chargeable device 104 by transmitting the output power signal to the chargeable device 104 through the wireless communication link 106 (as described with reference to FIG. 1).

At step 206, the second communication circuit 118 receives the version and size information of the third firmware file from the third communication circuit 130. The second communication circuit 118 provides the version and size information to the first processor 116. Note, it is assumed that the user has used an app on the chargeable device 104 to update the firmware of the wireless charger 102, or the wireless charger 102 has prompted the chargeable device 104 to check the manufacturer's website to see if a firmware update is available, and in response thereto, the version and size of third firmware file are provided to the wireless charger 102.

At step 208, the first processor 116 compares the version of the third firmware file with the versions of the first and second firmware files. At step 210, the first processor 116 determines whether the version of the third firmware file is newer than the versions of the first and second firmware files. If at step 210, the first processor 116 determines that the version of the third firmware file is older than the versions of the first and second firmware files, step 212 is performed. At step 212, the wireless charger 102 continues to operate based on the first firmware file (i.e., the current firmware file) stored in the second memory segment 114b. It should be noted that in one embodiment, the user can override such version checking and specify a version of the firmware to be downloaded using an app running on the chargeable device 104, as previously discussed.

If at step 210, the first processor 116 determines that the version of the third firmware file is newer than the versions of the first and second firmware files, then step 214 is performed. At step 214, the first processor 116 initiates reception of the third firmware file. To initiate reception of the third firmware file, the first processor 116 transmits the first request to the third communication circuit 130 by way of the second communication circuit 118 and the wireless communication link 106. Based on the first request, the second processor 128 initiates transmission of the third firmware file to the second communication circuit 118.

At step 216, the second communication circuit 118 receives a first set of data packets of the third firmware file from the third communication circuit 130 over the wireless communication link 106. At step 218, the first processor 116 stores the first set of data packets in the stand-by memory segment (i.e., the third memory segment 114c).

At step 220, the first processor 116 determines whether the wireless communication link 106 has been disconnected. To determine whether the wireless communication link 106 has been disconnected, the first processor 116 monitors the data signal. If at step 220, the first processor 116 determines that the wireless communication link 106 has not been disconnected, the program skips ahead to step 230. On the other hand, if at step 220, the first processor 116 determines that the wireless communication link 106 has been disconnected, step 222 is performed. At step 222, the first processor 116 detects interruption in reception of the third firmware file.

At step 224, the first processor 116 identifies the point of interruption (e.g., breakpoint) where reception of the third firmware file was interrupted. In one embodiment, the first processor 116 identifies the breakpoint based on the size of the first set of data packets received as compared with the size of the third firmware file.

At step 226, the first processor 116 determines whether the wireless communication link 106 has been reestablished. To determine whether the wireless communication link 106 has been reestablished, the first processor 116 monitors the data signal. If at step 226, the first processor 116 determines that the wireless communication link 106 has not been reestablished, step 226 is performed again. That is, the program loops at step 226 until the connection has been reestablished. If at step 226, the first processor 116 determines that the wireless communication link 106 has been reestablished, then step 228 is performed.

At step 228, the first processor 116 resumes reception of the third firmware file. To resume reception of the third firmware file, the first processor 116 generates the resume request indicating the breakpoint. The second communication circuit 118 transmits the resume request to the third communication circuit 130, and based on the resume request, the second processor 128 resumes transmission of the third firmware file from the breakpoint.

At step 230, the second communication circuit 118 receives the remaining data packets of the third firmware file from the third communication circuit 130, and at step 232, the first processor 116 stores the remaining data packets in the stand-by memory segment (i.e., the third memory segment 114c).

At step 234, the first processor 116 checks whether reception of the third firmware file is complete based on the size of the third firmware file (as compared to the size of the received data packets). If at step 234, the first processor 116 determines that reception of the third firmware file is not complete, the program loops back to step 220. If at step 234, the first processor 116 determines that reception of the third firmware file is complete, step 236 is performed.

At step 236, the first processor 116 selects one of the first and third firmware files as the current firmware file based on the corresponding receipt time. In other words, the first processor 116 selects one of the second and third memory segments 114b and 114c as the current memory segment based on the receipt time of the first and third firmware files. The first processor 116 selects the third firmware file, having the latest receipt time, as the current firmware file. By basing the selection on receipt time as opposed to version number, older versions of the firmware can be run even if a newer version was previously downloaded.

At step 238, the wireless charger 102 operates based on the selected one of the first and the third firmware files. As the first processor 116 has selected the third firmware file as the current firmware file, the third memory segment 114c serves as the current memory segment and the first processor 116 operates based on the third firmware file.

Figure 3C:
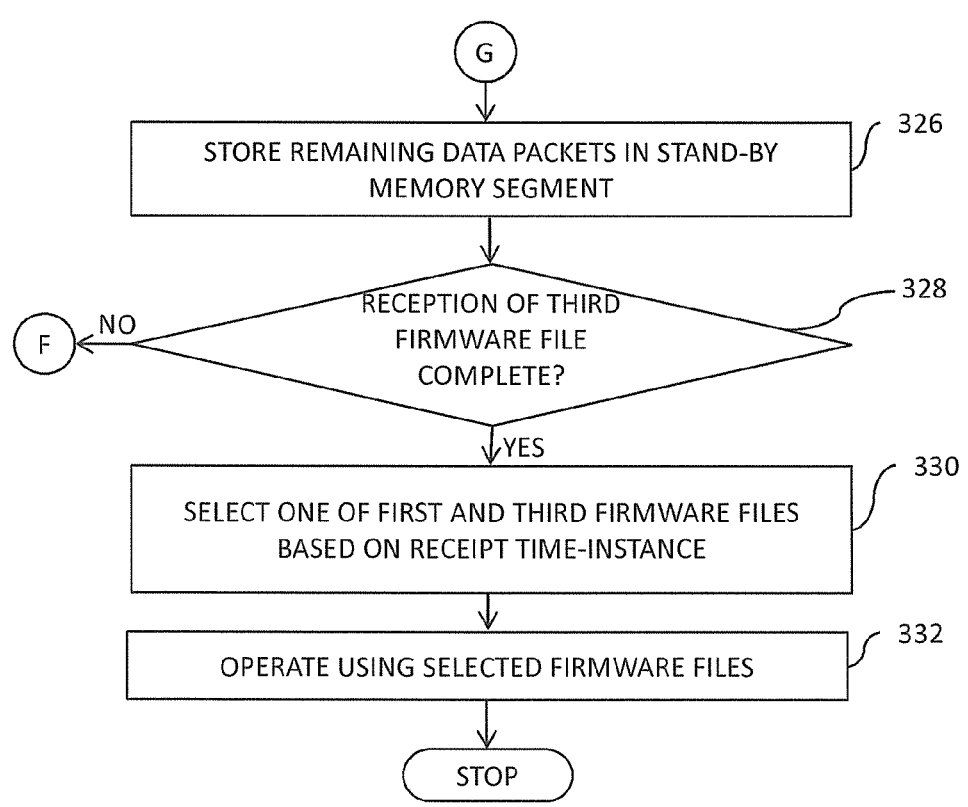
FIGS. 3A, 3B, and 3C are a flow chart illustrating a method for firmware update in a wireless charger in accordance with another embodiment of the present invention.
Figure 3A:
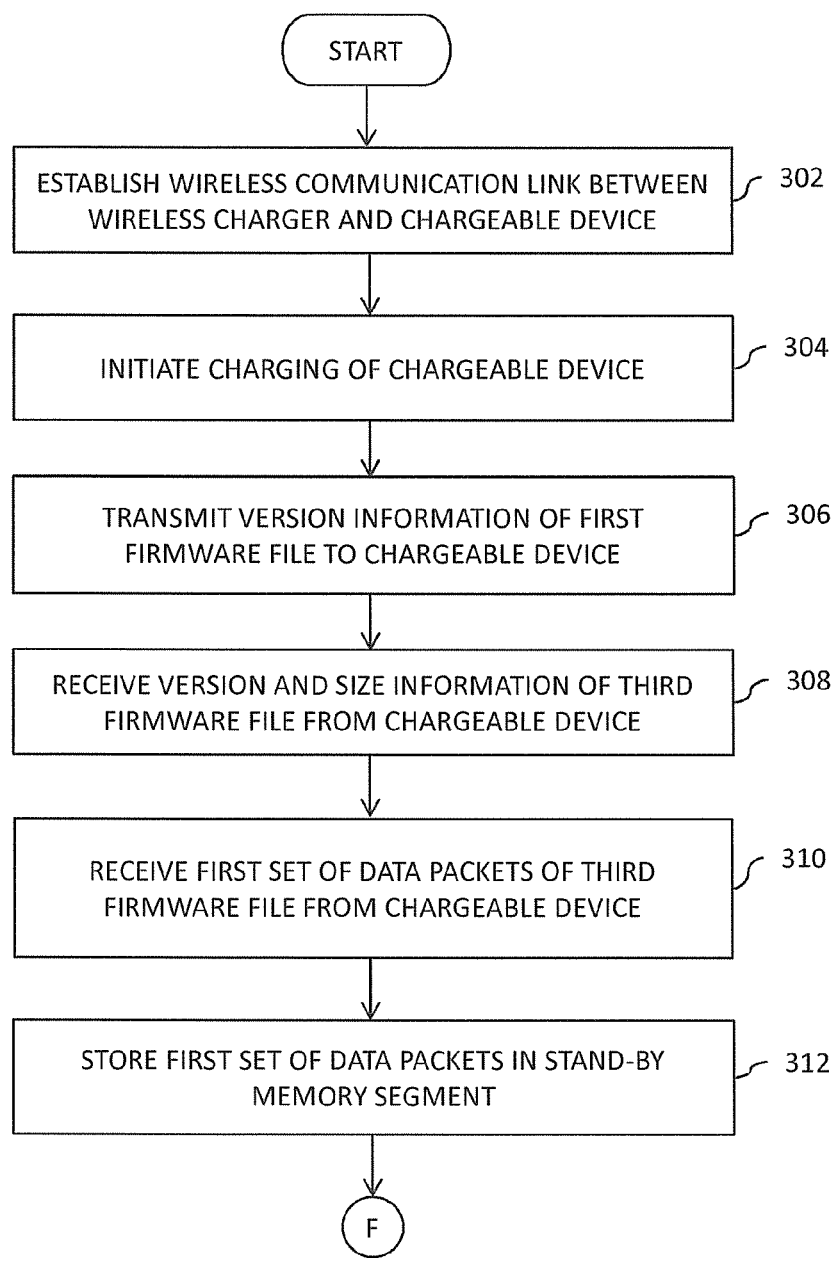
Figure 3B:
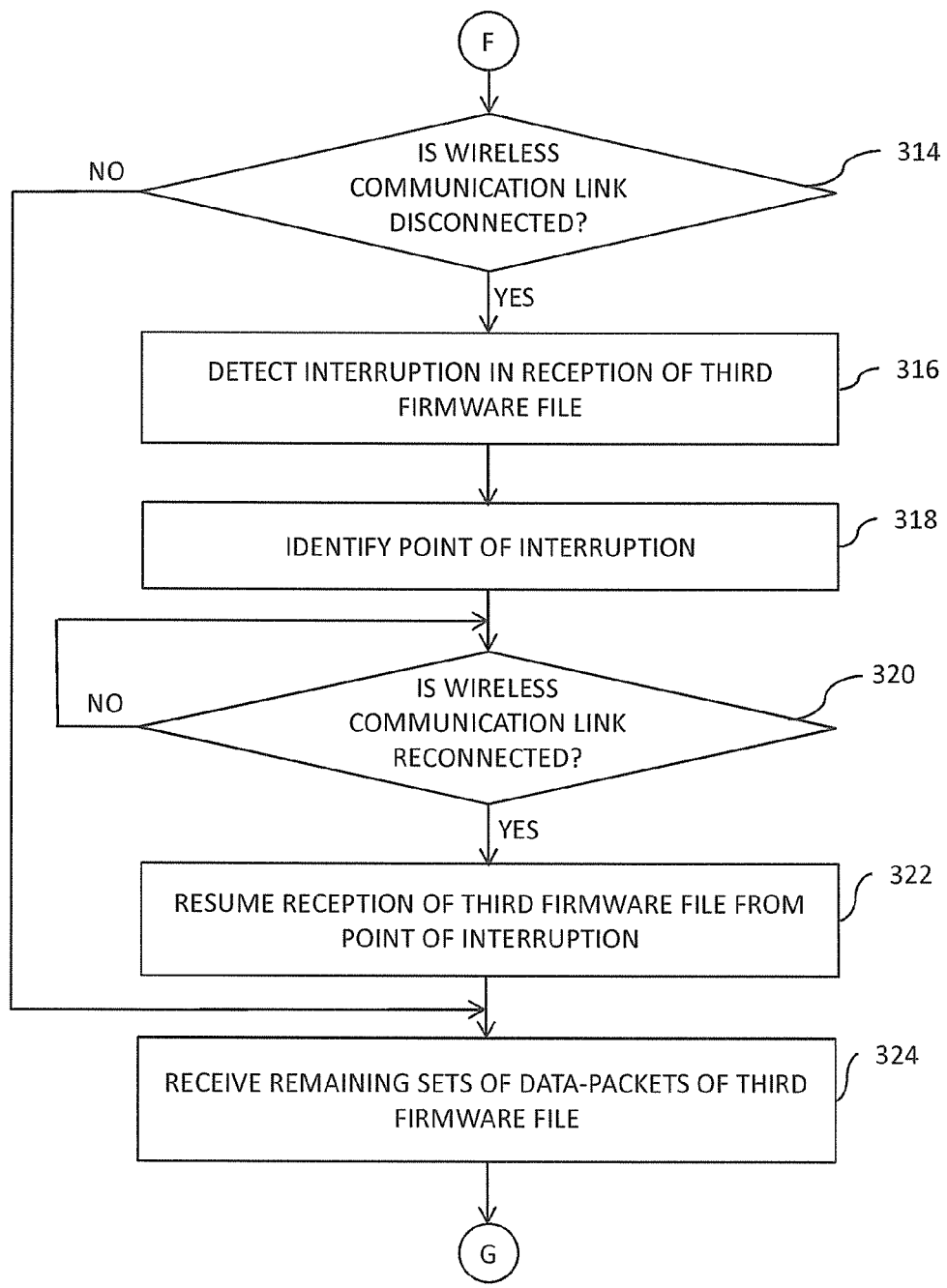

Referring now to FIGS. 3A-3C, a flow chart illustrating a method for firmware update in a wireless charger (such as the wireless charger 102 of FIG. 1), in accordance with another embodiment of the present invention, is shown. The wireless charger 102 is powered on and operates based on the first firmware file (i.e., the current firmware file) stored in the second memory segment 114b (i.e., the current memory segment). The third memory segment 114c serves as the stand-by memory segment having the second firmware file stored therein.

At step 302, the wireless charger 102 establishes the wireless communication link 106 between the wireless charger 102 and the chargeable device 104, when the chargeable device 104 is brought in contact with or within the predefined distance from the wireless charger 102.

At step 304, the wireless charger 102 initiates the charging of the chargeable device 104 by transmitting the output power signal to the chargeable device 104 over the wireless communication link 106.

At step 306, the second communication circuit 118 of the charger 102 transmits the version information of the first firmware file to the chargeable device 104 over the wireless communication link 106. In one embodiment, based on the version information of the first firmware file, the second processor 128 determines whether the wireless charger 102 requires a firmware update. In another embodiment, the user of the chargeable device 104 accesses a firmware update application (app) to check the version of the first firmware file to determine whether the wireless charger 102 requires a firmware update. If it is determined that the wireless charger 102 requires a firmware update, the second processor 128 transmits the version and size information of the third firmware file associated with the available firmware update to the wireless charger 102.

At step 308, the second communication circuit 118 receives the version and size information of the third firmware file, and provides the version and size information to the first processor 116. Further, the second processor 128 initiates transmission of the third firmware file to the second communication circuit 118 of the charger 102.

At step 310, the second communication circuit 118 receives a first set of data packets of the third firmware file from the third communication circuit 130. At step 312, the first processor 116 stores the first set of data packets in the stand-by memory segment (i.e., the third memory segment 114c).

At step 314, the first processor 116 checks to determine whether the wireless communication link 106 has been disconnected. It will be understood by those of skill in the art that while this is shown as a step being executed in series, this check could be performed by an interrupt. For example, if the connection with the chargeable device is disconnected, the processor 116 could receive an interrupt indicating the disconnection. If at step 314, the first processor 116 determines that the wireless communication link 106 has been disconnected, step 316 is performed. At step 316, the first processor 116 detects interruption in reception of the third firmware file.

At step 318, the first processor 116 identifies the point of interruption (i.e., the breakpoint) where reception of the third firmware file is interrupted. At step 320, the first processor 116 determines whether the wireless communication link 106 has been reestablished. If at step 320, the first processor 116 determines that the wireless communication link 106 has not been reestablished, the program loops on step 320. Otherwise step 322 is performed.

At step 322, the first processor 116 resumes reception of the third firmware file from the breakpoint. At step 324, the second communication circuit 118 receives the remaining data packets of the third firmware file from the third communication circuit 130. At step 326, the first processor 116 stores the remaining data packets of the third firmware file in the stand-by memory segment (i.e., the third memory segment 114c).

At step 328, the first processor 116 determines whether reception of the third firmware file is complete. If at step 328, the first processor 116 determines that reception of the third firmware file is not complete, the program loops back to step 314. Otherwise step 330 is performed. At step 330, in the presently preferred embodiment, the first processor 116 selects one of the first and third firmware files as the current firmware file based on the corresponding receipt time. Since the third firmware file has the latest receipt time, the first processor 116 selects the third firmware file as the current firmware file. As previously noted, this a user to revert to earlier versions of the firmware.

At step 332, the wireless charger 102 operates based on the selected one of the first and third versions of the firmware program. As the first processor 116 has selected the third version of the firmware program, the wireless charger 102 operates based on the third version of the firmware program, and the second memory segment 114b now serves as the stand-by memory segment. If at step 314, the first processor 116 determines that the wireless communication link 106 has not been disconnected, then the program skips ahead to step 324.

The method illustrated in FIGS. 2A-2D or 3A-3C provides a convenient way of updating the firmware of the wireless charger 102. The method uses the existing wireless link 106 that is established during charging of the chargeable device 104 to update the firmware of the wireless charger 102. The wireless charger 102 does not need to be disassembled and reprogrammed to update the current firmware version. Further, the method and system eliminate the need for having an additional communication port in the wireless charger 102. The current firmware program of the wireless charger 102 also may be downgraded to an older version by the user of the chargeable device 104 by using a firmware update app (application program) installed on the chargeable device 104.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A wireless charger for charging a chargeable device over a wireless link, the wireless charger comprising:
    a communication circuit including a first transceiver, a power converter, and a first coil, wherein the first coil creates an electromagnetic field to transfer energy over the wireless link to a second coil in the chargeable device, said energy being used by the chargeable device to re-charge a battery thereof;
    a memory, coupled to the communication circuit, and including a first segment for storing a boot program, a second segment for storing a first version of a firmware program, and a third segment for storing a second version of the firmware program; and a processor coupled to the communication circuit and the memory, wherein the processor operates based on a selected one of the first and second versions of the firmware program stored in the memory, wherein:

the communication circuit is configured to receive the second version of the firmware program from the chargeable device, by way of the wireless link which transfers energy from the wireless charger to the chargeable device, and store the second version of the firmware program in the third segment of the memory; and the processor selects between the first and second versions of the firmware program based on which of the second and third memory segments was most recently updated.

2. The wireless charger of claim 1, wherein the processor further operates based on the first version of the firmware program during reception of the second version of the firmware program.

3. The wireless charger of claim 1, wherein the communication circuit is further configured to:

transmit a version number of the first version of the firmware program to the chargeable device over the wireless link before the second version of the firmware program is received, and wherein the communication circuit receives the second version of the firmware program based on a comparison performed by the chargeable device between the version number of the first version of the firmware program and a version number of the second version of the firmware program.

4. The wireless charger of claim 1, wherein when the wireless link between the wireless charger and the chargeable device has been disconnected before completion of transferring the second version of the firmware program from the chargeable device to the wireless charger:

the processor identifies a point of interruption where reception of the second version of the firmware program was interrupted when the wireless link was disconnected, wherein a first set of data packets of the second version of the firmware program was received by the communication circuit prior to the point of interruption, and the processor resumes reception of the second version of the firmware program from the identified point of interruption, after the wireless link has been re-established, for receiving a remaining set of data packets of the second version of the firmware program.

5. The wireless charger of claim 4, wherein the wireless link is disconnected when one of the wireless charger and the chargeable device is powered off.

6. The wireless charger of claim 4, wherein the wireless link is disconnected when a distance between the wireless charger and the chargeable device is greater than a predefined distance.

7. The wireless charger of claim 4, wherein:

the communication circuit also is configured to receive information of a size of the second version of the firmware program from the chargeable device before receiving the second version of the firmware program.

8. The wireless charger of claim 7, wherein the processor identifies the point of interruption based on a size of the first set of data packets and the size of the second version of the firmware program.

9. The wireless charger of claim 1, wherein:

the communication circuit also is configured to receive a version number of the second version of the firmware program from the chargeable device before receiving the second version of the firmware program; and the processor initiates reception of the second version of the firmware program when the version number indicates that the first version of the firmware program is older than the second version of the firmware program.

10. The wireless charger of claim 1, wherein the wireless link is a bi-directional communication link established by way of one of inductive coupling and resonant coupling between the first and second coils.

11. A method for updating a firmware program in a wireless charger, wherein the wireless charger transfers energy over a wireless link to a chargeable device to charge a battery of the chargeable device, and wherein a first version of the firmware program is stored in a first memory segment of a memory of the wireless charger, the method comprising:

receiving, by a communication circuit of the wireless charger, from the chargeable device, a second version of the firmware program over the wireless link which transfers energy from the wireless charger to the chargeable device;

storing, by the communication circuit, the second version of the firmware program in a second memory segment of the memory; and selecting, by a processor of the wireless charger, between the first and second versions of the firmware program based on which of the first and second memory segments was most recently updated.

12. The method of claim 11, wherein the processor operates based on the first version of the firmware program during reception of the second version of the firmware program.

13. The method of claim 11, further comprising:

identifying, by the processor, a point of interruption where reception of the second version of the firmware program was interrupted when the wireless communication link was disconnected, wherein a first set of data packets was received by the wireless charger up to the point of interruption; and resuming, by the processor, reception of the second version of the firmware program from the point of interruption, when the wireless communication link is re-established, wherein the communication circuit receives a remaining set of data packets of the second version of the firmware program.

14. The method of claim 13, further comprising:

receiving, by the communication circuit, information of a size of the second version of the firmware program, from the chargeable device over the wireless link, before receiving the second version of the firmware program.

15. The method of claim 14, wherein the identification of the point of interruption is based on a size of the first set of data packets and the size of the second version of the firmware program.

16. The method of claim 13, wherein the wireless link is disconnected when one of the wireless charger and the chargeable device is powered off.

17. The method of claim 13, wherein the wireless link is disconnected when a distance between the wireless charger and the chargeable device is greater than a predefined distance.

18. The method of claim 11, further comprising:
receiving, by the communication circuit, a version number of the second version of the firmware program from the chargeable device over the wireless link before receiving the second version of the firmware program; and
initiating, by the processor, reception of the second version of the firmware program when the version number indicates that the first version of the firmware program is older than the second version of the firmware program.

19. The method of claim 11, further comprising:
transmitting, by the communication circuit, a version number of the first version of the firmware program to the chargeable device over the wireless link before the second version of the firmware program is received, wherein the wireless charger receives the second version of the firmware program based on a comparison performed by the chargeable device between the version number of the first version of the firmware program and a version number of the second version of the firmware program.

20. The method of claim 11, wherein the wireless link is a bi-directional communication link established between the wireless charger and the chargeable device by way of one of inductive coupling and resonant coupling.

\* \* \* \* \*